United States Patent

Kielbania, Jr. et al.

[11] Patent Number: 5,858,549
[45] Date of Patent: Jan. 12, 1999

[54] (HYDROXYALKYL)UREA CROSSLINKING AGENTS

[75] Inventors: Andrew J. Kielbania, Jr., Chalfont, Pa.; Pravin Kukkala, Raritan, N.J.; Sharon Lee, Edison, N.J.; John C. Leighton, Flanders, N.J.

[73] Assignee: National Starch and Chemical Investment Holding Corporation, Wilmington, Del.

[21] Appl. No.: 783,350

[22] Filed: Jan. 7, 1997

[51] Int. Cl.⁶ .......................... B32B 27/08; C08G 69/48; C08L 75/00; C08F 283/00
[52] U.S. Cl. ................. 428/474.4; 428/482; 525/418; 525/424; 525/452; 525/540
[58] Field of Search ................... 525/418, 452, 525/424, 540; 428/482, 474.4

[56] References Cited

U.S. PATENT DOCUMENTS

| | | | |
|---|---|---|---|
| 3,965,072 | 6/1976 | Markiewitz | 260/77.5 C |
| 4,076,917 | 2/1978 | Swift et al. | 526/49 |
| 4,101,606 | 7/1978 | Cenci et al. | 260/857 UN |
| 4,115,637 | 9/1978 | Cenci et al. | 526/36 |
| 4,138,541 | 2/1979 | Cenci et al. | 526/303 |
| 4,203,900 | 5/1980 | Kaiser | 548/239 |
| 4,209,607 | 6/1980 | Shalaby et al. | 528/291 |
| 4,293,669 | 10/1981 | Rottmaier et al. | 525/452 |
| 4,443,490 | 4/1984 | Nakajima et al. | 427/44 |
| 4,482,659 | 11/1984 | Sanjana et al. | 523/414 |
| 4,546,121 | 10/1985 | Haas et al. | 521/164 |
| 4,608,419 | 8/1986 | Dorman et al. | 525/329.9 |
| 4,626,575 | 12/1986 | Goel | 525/329.5 |
| 4,677,167 | 6/1987 | Goel | 525/375 |
| 4,705,885 | 11/1987 | Just et al. | 560/158 |
| 4,708,984 | 11/1987 | Forgione et al. | 525/127 |
| 4,727,111 | 2/1988 | Pettit, Jr. et al. | 525/190 |
| 4,761,457 | 8/1988 | Arita et al. | 525/439 |
| 4,785,070 | 11/1988 | Rasmussen et al. | 528/73 |
| 4,788,255 | 11/1988 | Pettit, Jr. et al. | 525/131 |
| 4,801,680 | 1/1989 | Geary et al. | 528/272 |
| 4,889,890 | 12/1989 | Kerr et al. | 525/113 |
| 4,937,288 | 6/1990 | Pettit, Jr. et al. | 525/176 |
| 4,963,640 | 10/1990 | Dewhurst | 528/73 |
| 4,988,767 | 1/1991 | Pettit, Jr. | 525/194 |
| 4,990,579 | 2/1991 | Paar | 525/528 |
| 5,006,622 | 4/1991 | Kunzler et al. | 526/309 |
| 5,013,791 | 5/1991 | Kerr et al. | 525/113 |
| 5,039,759 | 8/1991 | Hoy et al. | 525/437 |
| 5,098,955 | 3/1992 | Pettit, Jr. | 525/194 |
| 5,124,421 | 6/1992 | Ulbrich et al. | 526/212 |
| 5,130,479 | 7/1992 | Ulbrich et al. | 562/874 |
| 5,143,582 | 9/1992 | Arkens et al. | 162/135 |
| 5,182,337 | 1/1993 | Pettit, Jr. et al. | 525/176 |
| 5,214,101 | 5/1993 | Pettit, Jr. et al. | 525/176 |
| 5,266,628 | 11/1993 | Essary et al. | 524/336 |
| 5,292,807 | 3/1994 | Schafer et al. | 525/113 |
| 5,318,990 | 6/1994 | Strauss | 524/549 |
| 5,340,868 | 8/1994 | Strauss et al. | 524/461 |
| 5,346,947 | 9/1994 | Guerro et al. | 524/591 |
| 5,360,876 | 11/1994 | Burgoyne, Jr. et al. | 525/374 |
| 5,395,911 | 3/1995 | Frings et al. | 528/87 |
| 5,427,587 | 6/1995 | Arkens et al. | 8/116.1 |
| 5,536,766 | 7/1996 | Seyffer et al. | 524/100 |

FOREIGN PATENT DOCUMENTS

| | | | |
|---|---|---|---|
| 0 471 409 A1 | 2/1992 | European Pat. Off. | C09D 5/03 |
| 0 583 086 A1 | 2/1994 | European Pat. Off. | D04H 1/64 |
| 0 651 088 A1 | 5/1995 | European Pat. Off. | D06M 15/263 |
| 1 466 996 | 2/1969 | Germany . | |
| 5 148429 | 3/1991 | Japan . | |
| WO 94/03545 | 2/1994 | WIPO | C09D 5/03 |
| WO 94/11451 | 5/1994 | WIPO | C09D 167/00 |

*Primary Examiner*—Randy Gulakowski
*Attorney, Agent, or Firm*—William K. Wissing

[57] ABSTRACT

(Hydroxyalkyl)urea crosslinking agents and compositions which utilize such crosslinking agents are disclosed. The crosslinking agents contain a single urea group, at least two hydroxyl groups, and have at least two carbon atoms disposed between the urea group and each of the hydroxyl groups. The compositions contain a poly-functional molecule which contains at least two functional groups selected from the group consisting of carboxyl, anhydride and amine.

8 Claims, 1 Drawing Sheet

(HYDROXYALKYL)UREA CROSSLINKING AGENTS

FIELD OF THE INVENTION

The present invention relates to (hydroxyalkyl)urea crosslinking agents and the use thereof to replace formaldehyde-based crosslinking agents.

BACKGROUND OF THE INVENTION

Synthetic polymers are used in a wide variety of applications. In many applications, these synthetic polymers are crosslinked in order to achieve the required performance properties. For over 60 years, a large class of commercially important thermoset polymers have utilized formaldehyde-based crosslinking agents. Such crosslinking agents based on formaldehyde traditionally have provided an efficient and cost-effective means of curing a wide variety of materials. Examples of formaldehyde-based crosslinking agents include melamine-formaldehyde, urea-formaldehyde, phenol-formaldehyde and acrylamide-formaldehyde adducts. With growing toxicity and environmental concerns, there has been an ongoing search to replace formaldehyde-based crosslinking agents. However, these alternative crosslinkers have suffered from significant deficiencies including low or slow cure, requiring end uses to change their commercial high speed application equipment, emission of toxic components or volatile organic compounds other than formaldehyde.

A particularly attractive crosslinking reaction involves the esterification of a carboxylic acid functional polymer with a hydroxyl functional polymer. This is an attractive reaction since water is the only product of the crosslinking reaction. However, for polymeric systems, this reaction is difficult to conduct effectively since it is slow under conventional time and temperature conditions of cure. Raising the temperature to force this curing reaction results in unacceptable color development and/or degradation, with the emission of unwanted volatile organic compounds.

β-Hydroxyalkyl amide functionality was developed to facilitate the esterification crosslinking of carboxylic acid containing polymers. However, this technology still is deficient in crosslinking rate and crosslinking densities under conditions typically used for formaldehyde based crosslinking agents. In addition to the high temperature and long curing time requirements for crosslinking, the use of a catalyst is only marginally effective in accelerating the reaction of β-hydroxyl amides.

To address this unfilled need for a robust formaldehyde-free crosslinker, we have found unexpectedly that (hydroxyalkyl)urea derivatives result in facile and safe crosslinking of di- and/or poly-functionalized molecules and polymers, as described herein below.

SUMMARY OF THE INVENTION

The present invention relates to (hydroxyalkyl)urea crosslinking agents which are essentially free of formaldehyde and to compositions which utilize such crosslinking agents. The compositions comprise a poly-functional molecule comprising at least two functional groups selected from the group consisting of carboxyl, anhydride and amine; and the (hydroxyalkyl)urea crosslinking agent, present in amounts effective to provide crosslinked compositions. The crosslinking agent will comprise only a single urea group, at least two hydroxyl groups, and there must be at least two carbon atoms disposed between the urea group and each of the hydroxyl groups.

DETAILED DESCRIPTION OF THE INVENTION

Figure 1:
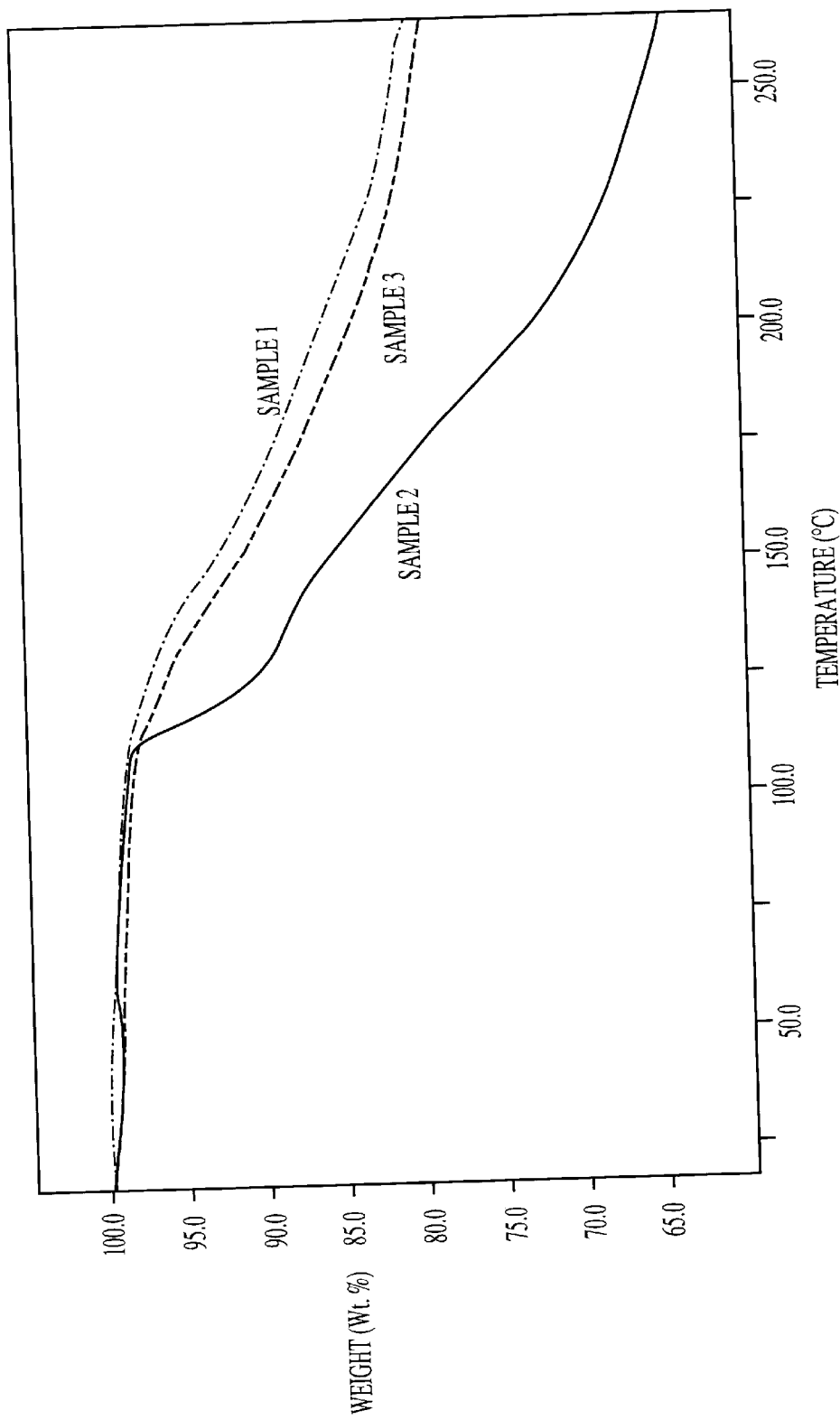
FIG. 1 is a thermogravimetric analysis (TGA) thermogram comparing crosslinking properties of (hydroxyalkyl) urea (HAU) crosslinking agents to hydroxyalkyl amide (HAA) crosslinking agents.

The compositions according to the present invention comprise a poly-functional molecule (PFM). As used herein, "molecule" includes non-polymeric molecules, low molecular weight polymers or oligomers, for instance having molecular weight of less than about 10,000, and higher molecular weight polymers, for instance having molecular weight of greater than about 10,000 to greater than 1,000,000. The actual molecular weight of the molecule is not a limiting factor with respect to the use of the crosslinking agents of the present invention.

The PFM must contain at least two functional groups selected from the group consisting of carboxyl, anhydride and amine. Exemplary molecules which may be used in the present invention include without limitation citric acid, 1,2,4-benzene tricarboxylic acid, 1,2,4,5-benzene tetracarboxylic acid, 1,2,3,4-butane tetracarboxylic acid, poly (acrylic acid), carboxylic-acid-functionalized polyesters, carboxylic-acid-functionalized polyurethanes, polyethylenimine, poly(vinyl amine-covinyl alcohol), poly (vinyl amines) and polymers prepared from monomers such as ethylene (E), vinyl acetate (VA), (meth)acrylic acid (M)AA, the $C_1$–$C_8$ alkyl esters of (meth)acrylic acid, maleic anhydride (MAnh), maleic acid, itaconic acid (IA), crotonic acid (CA), β-carboxy ethyl acrylate (BCEA), butadiene and styrene (STY). (Meth)acrylic is used herein to denote both acrylic and methacrylic acids and esters thereof. Exemplary copolymers include ethylene/vinyl acetate/acrylic acid copolymers, vinyl acetate/acrylic acid copolymers, acrylic acid/maleic anhydride copolymers, vinyl acetate/acrylic acid/maleic anhydride copolymers, ethylene/acrylic acid copolymers, ethylene/methacrylic acid copolymers, ethylene/vinyl acetate/acrylic acid/maleic anhydride copolymers, vinyl acetate/maleic anhydride copolymers, ethylene/vinyl acetate/maleic anhydride copolymers, methyl methacrylate/butyl acrylate/acrylic acid copolymers, methyl methacrylate/ethyl acrylate/acrylic acid copolymers, methyl methacrylate/butyl acrylate/itaconic acid copolymers, butyl acrylate/acrylic acid copolymers, butyl acrylate/BCEA copolymers, ethyl acrylate/acrylic acid copolymers, 2-ethylhexyl acrylate/acrylic acid copolymers, methyl methacrylate/ethyl (meth)acrylate/itaconic acid copolymers, styrene/(meth)acrylic acid copolymers, styrene/maleic anhydride copolymers, styrene/(meth)acrylic acid/maleic anhydride copolymers, styrene/itaconic acid copolymers and styrene/butadiene copolymers. Additionally, polymers comprising anhydride groups may be generated in situ during preparation of poly(acrylic acid). These examples are not limiting and the (hydroxyalkyl)urea crosslinking agents according to the present invention may be used to crosslink virtually any molecule which comprises at least two functional groups selected from the group consisting of carboxyl, amine and anhydride. The (hydroxyalkyl)urea crosslinking agent is very versatile and may be used easily to crosslink aqueous solution polymers, organic solution polymers, polymer melts, emulsion polymers, aqueous and non-aqueous dispersions of polymers, and powders.

The crosslinking agents of the present invention are derived from urea, comprise only a single urea group, at least two hydroxyl groups, at least two carbon atoms disposed between the urea group and each of the hydroxyl groups, and may include any of those compounds represented by Structure (1). The two carbons disposed between the hydroxyl and urea groups may be in linear, branched or substituted configuration.

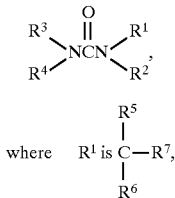

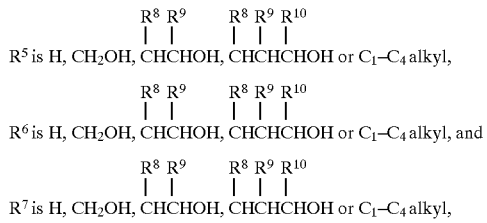

where $R^8$ is H, methyl or ethyl, $R^9$ is H, methyl or ethyl, and $R^{10}$ is H, methyl or ethyl.

Exemplary HAU crosslinkers include, without limitation, N,N-bis(2-hydroxyethyl)urea, tetrakis(2-hydroxyethyl)urea, tris(2-hydroxyethyl)urea, N,N'-bis(2-hydroxyethyl)urea, N,N'-bis(3-hydroxypropyl)urea, N,N'-bis(4-hydroxybutyl) urea and 2-urea-2-ethyl-1,3-propanediol. The terms "crosslinking agent" and "crosslinker" are used interchangeably herein.

In certain embodiments of the invention, the PFM may be generated in situ from starting molecules which do not comprise at least two functional groups selected from the group consisting of carboxyl, anhydride and amine. When the starting molecules and the HAU crosslinkers are combined under certain conditions effective to induce crosslinking, functional groups will be generated such that the molecules comprise at least two functional groups selected from the group consisting of carboxyl, anhydride and amine. The functional groups may be generated in situ by the addition of heat to the system or by chemical reaction with the starting molecules, For example, acid catalyzed hydrolysis of alkyl esters such as methyl or t-butyl, are very facile in generating carboxylic acid. Other mechanisms of generating functional groups in situ will be readily apparent to those skilled in the art once having the benefit of the teachings contained herein.

It surprisingly was noted that when a HAU crosslinker is compared to other crosslinkers which contain at least two hydroxyl groups, the HAU systems exhibited dramatic improvement in crosslinking uncatalyzed systems, i.e. systems which comprise the PFM and the crosslinker, but do not contain a catalyst. For example, in Table 5a herein, HAU, HAA and glycerol, all containing two or more hydroxyl groups, are used to crosslink poly(acrylic acid). In uncatalyzed systems, the percent insolubles of the three systems are 42%, 3% and 0%, respectively, indicating that the urea group in combination with the two hydroxyl groups is critical in achieving desired crosslinking properties and that merely using a crosslinker with at least two hydroxy groups is not sufficient to realize the benefits afforded by the present invention. When the HAU and the HAA are used independently in combination with a catalyst such as sodium hypophosphite, the percent insolubles are 52% and 51%, respectively. The data indicate that the HAU crosslinkers possess synergism in that they perform well as crosslinkers both in catalyzed and uncatalyzed systems, while it has been reported in the literature that other polyol crosslinkers which comprise at least two hydroxyl groups must be used in combination with a phosphorus-containing catalyst to achieve crosslinking properties which approach those of the HAU crosslinkers. Specifically, EP patent application 0 583 086 teaches that in order for the crosslinkers disclosed therein to be effective, they must be used in combination with a catalyst that contains phosphorus, as opposed to any class of catalyst. Accordingly, if any comparison is to be made between the HAU crosslinkers of the present invention and the HAA crosslinkers reported in the EP patent application, the fact that the HAU crosslinkers work in systems which are catalyzed with catalysts which do not contain phosphoros is unexpected. The fact that the HAU crosslinkers work at all in uncatalyzed systems is particularly surprising in view of the teachings of EP 0 583 086.

Furthermore, it surprisingly was found that the HAU crosslinking agents according to the present invention significantly enhance the crosslinking reaction rate, and thus the crosslinking efficiency, when compared to hydroxyalkyl amides (HAA) which may be used to crosslink molecules comprising at least two functional groups selected from carboxyl, amine and anhydride. This accelerated crosslinking may be observed by conducting thermogravimetric analysis (TGA).

FIG. 1 is a thermogram comparing poly(acrylic acid) cured with bis[N,N-di(beta-hydroxyethyl)]adipamide (HAA crosslinker, Sample 1) to the same poly(acrylic acid) cured with N,N-bis(2-hydroxyethyl)urea (HAU crosslinker, Sample 2). Sample 3 is the same HAA crosslinker which has been catalyzed with a phosphorus-containing catalyst. The cure can be followed by the weight loss due to the release of water which is a byproduct of the cure.

As noted, the catalyst improved the performance of the HM crosslinker. Of particular note is the fact that the "uncatalyzed" HAU crosslinker (Sample 2) was much more efficient than the "catalyzed" HAA crosslinker (Sample 3). Furthermore, the degree of improvement of the uncatalyzed HAU crosslinker over the uncatalyzed HAA crosslinker was significantly greater than the degree of improvement of the "catalyzed" HAA crosslinker (Sample 3) over the uncatalyzed HAA crosslinker. The data clearly show that the HAU crosslinker is significantly more efficient than the HAA crosslinker with respect to the rate of cure. Based on the results of the TGA, films crosslinked with HAA and films crosslinked with HAU were cured in the TGA isothermally for 5 minutes at 120° C. The HAA-crosslinked film was 40 percent insoluble in water, compared to the HAU-crosslinked film which was 85 percent insoluble. This again indicates that HAU crosslinkers are significantly more efficient at crosslinking molecules according to the present invention than are HAA crosslinkers. Sample 3 in FIG. 1 is the same poly(acrylic acid) crosslinked with HAA and further using a phosphorus-containing catalyst. As observed, the use of a catalyst does improve crosslinking.

The relative degree of crosslinking generated by HAU and HAA crosslinking agents may be observed by measuring the water and solvent resistance of the crosslinked molecule (via the determination of percent insolubles). As observed in Table 5, poly(acrylic acid) Mw 90,000 was crosslinked both with HAU and HAA crosslinkers by curing at 240° C. for ten minutes. With respect to the degree of crosslinking, the HAU crosslinker was as efficient or better than the HAA crosslinkers (92% insolubles (HAU) vs. 91% and 74% insolubles, (HAA)s respectively).

The PFM and the HAU crosslinking agent will be present in relative amounts such that the ratio of the sum total number of equivalents of the functional groups contained in the PFM to the number of equivalents of the hydroxyl groups contained in the HAU crosslinker ranges from about 1:1 to about 100:1. Preferably, the ratio of the sum total number of equivalents of the functional groups contained in the PFM to the number of equivalents of the hydroxyl groups contained in the HAU crosslinker ranges from about 5:4 to about 10:1.

In certain embodiments of the present invention, Lewis acid and Lewis base catalysts may be used in combination with the crosslinking agent in order to further enhance crosslinking. Such catalysts generally include clays, silica, including without limitation colloidal silica, organic amines, quaternized-amines, metal oxides, metal sulfates, metal chlorides, urea sulfate, urea chloride and silicate-based catalysts. Exemplary Lewis acid and Lewis base catalysts which may be used in the invention are set forth in Table 11. Phosphorus-containing catalysts may be used in the present invention, including without limitation alkali metal hypophosphite salts, alkali metal phosphites, alkali metal polyphosphates, alkali metal dihydrogen phosphates, polyphosphoric acid and alkyl phosphinic acids. Such catalysts, when used, are used in less than stoichiometric amounts as the maximum level allowed, and in minimum amounts effective to improve crosslinking compared to a non-catalyzed, crosslinked composition. Each of the "catalyzed", crosslinked compositions of the invention exhibited significant increase in crosslinking when compared to a non-catalyzed, crosslinked composition of the invention, as evidence by the increase in insolubles noted in Table 11.

In methods of crosslinking the PFMs with the HAU crosslinkers, the HAU and PFM are combined under conditions effective to induce crosslinking of the PFM. Such conditions permit water to be removed from the system, thereby inducing crosslinking of the PFM. These conditions may be provided by adjusting temperature and/or pressure. For example, it is advantageous to cure the compositions at temperatures around 100° C., preferably greater than 100° C., in order to drive off water from the system. In fact, one of the advantages of the crosslinkers of the present invention is that they are stable at elevated temperatures and therefore work particularly well in systems which must be cured at temperatures greater than 100° C. Curing may occur at pressures where water may be removed from the system, for example at low pressures or under vacuum. Both temperature and pressure be may be adjusted such that water may be removed from the system. Additionally, crosslinking may be induced by chemical reaction. For example, as noted herein above, under certain conditions PFMs may be generated in situ. Whether crosslinking be induced by heat transfer or by chemical reaction, the conditions must be effective to remove water from the system, thereby inducing crosslinking.

Compositions of the present invention may be used in preparing a number of compositions and articles of manufacture and may be applied to polymeric natural substrates, such as woven or non-woven cellulose, wood, leather, paper, cotton, wool, rayon and silk, and polymeric synthetic substrates, such as polyolefin, polyester, polyamide, polyvinyl chloride, polyvinylidene chloride and polyimide. Other substrates to which the compositions may be applied include glass, metal and composite substrates such as sand, ceramic, foundry sand and molds. The compositions may be used in preparing coatings, such as automotive coatings, powder coatings, adhesive coatings, inks and paints. The compositions also may be used as binders or sizing agents in the preparation of, for example, glass or cellulosic fibers, non-woven paper products, fiberglass insulation or batting, glass fiber rovings and molded fiberglass articles. The compositions also may be used as binders in woven and non-woven textiles and as backcoatings in carpets and other textiles. The compositions further may be used as saturants in the preparation of laminates, foams and mastics and as adhesives for the natural and synthetic substrates noted above.

Representative crosslinking agents of the present invention and methods for making same are set forth below. While one skilled in the art may be aware of other means of producing such compounds, the following examples are among the preferred methods for preparing the crosslinking agents.

Synthesis of Crosslinking Agents

EXAMPLE 1

105 g diethanolamine and 60 g urea were charged in a 1 L flask equipped with heating mantle, thermometer and stirrer and allowed to react at 115° C. for 8 hours. A nitrogen purge was used to remove evolving ammonia. The progress of reaction was monitored by amine titration. A clear, hygroscopic liquid was obtained which contained N,N-bis (2-hydroxyethyl)urea, which could be used as a crosslinker without purification.

In a similar manner the following amines were reacted with urea

| Example | Amine | Wt, g | Urea, g |
| --- | --- | --- | --- |
| 2 | ethanolamine | 122 | 60 |
| 3 | diethanolamine | 210 | 60 |
| 4 | ethanolamine | 61 | 60 |
|   | diethanolamine | 105 |   |
| 5 | 3-amino-1-propanol | 150 | 60 |
| 6 | 2-amino-2-ethyl-1,3-propanediol (AEPD) | 119 | 30 |
| 7 | 4-aminobutanol | 12 | 4 |

Additional alkanolamines also may be used and include, without limitation, 2-amino-2-methyl-1, 3-propanediol, ris (hydroxymethyl)amino-methane, 2-methyl-3-amino-1-propanol and 2-methylaminoethanol.

EXAMPLE 8

100 g of diethanolamine in 100 g water was neutralized with concentrated hydrochloric acid. 77.2 g potassium cyanate were added and the mixture heated to 90° C. for 2 hours. After cooling to ambient temperature, potassium chloride was precipitated by addition of 200 ml of ethanol. The salt was filtered out and the final product was obtained upon removal of water and ethanol by rotary evaporation. The product was a hygroscopic liquid containing N,N-bis(2-hydroxyethyl)urea, which could be used as a crosslinker without further purification. The product similarly could be obtained using other acids to neutralize the amine, e.g. sulfuric acid, and using other cyanates, e.g. sodium cyanate

EXAMPLE 9

105 g diethanolamine and 90 g dimethylcarbonate were charged to a flask equipped with a heating mantle, stirrer, and condenser. The flask contents were heated to 80° C. and allowed to stir for 3 hours. Volatile byproducts, eg.

methanol, were removed by vacuum distillation. A mixture containing N,N-bis(2-hydroxyethyl)urea was obtained.

EXAMPLE 10

Using the method of example 1, the reaction also can be conducted effectively using refluxing water as a means of removing evolved ammonia. 105 g diethanolamine, 25 g water and 60 g urea were charged in a 1 L flask equipped with heating mantle, thermometer and stirrer and allowed to react at 115° C. for 8 hours.

EXAMPLE 11

Using the method of example 9, 210 g diethanolamine was reacted with 90 g dimethyl carbonate. A mixture was obtained containing tetrakis(2-hydroxyethyl)urea.

EXAMPLE 12

Using the method of example 9, 122 g ethanolamine was reacted with 90 g dimethyl carbonate. A mixture was obtained containing N,N'-bis(2-hydroxyethyl)urea.

Procedure for Determining Extent of Crosslinking by Measuring Percent Insoluble in solvent 1. Combine polymer and crosslinker in specified amounts, based on equivalent weights.
2. Cast film in petri dish and dry overnight under ambient conditions.
3. Cut approximately 1 g piece of film and weigh accurately.
4. Put film in weighed 1 oz glass jar and cure according to specified time/temperature schedule. (Usual conditions for 1 g sample of film is 240° C., 10 minutes). Weigh film again.
5. Fill jar with water (or other specified solvent). Cap jar and store overnight under ambient conditions.
6. Filter sample through weighed stainless 200 mesh screen.
7. Dry sample and screen to constant weight. Reweigh for final weight.
8. Calculate percent Insoluble=dried sample weight/cured sample weight×100%.

The following tables set forth crosslinking data for compositions of the present invention and for comparative compositions utilizing both conventional formaldehyde-based crosslinkers and conventional formaldehyde-free crosslinkers.

TABLE 1

HAU Crosslinking of Poly(Acrylic Acid)

| HAU Crosslinker | Water Resistance % Insoluble |
|---|---|
| N,N-bis(2-hydroxyethyl) urea | 100 |
| Tetrakis(2-hydroxyethyl) urea | 47 |
| Tris(2-hydroxyethyl) urea | 85 |
| N,N'-bis(2-hydroxyethyl) urea | 100 |
| N,N'-bis(3-hydroxypropyl) urea | 74 |
| None | 0 |

Polymer: poly(acrylic acid); 60,000 Mw
Cure: 240° C.; 10 minutes
0.8 equivalents crosslinker

TABLE 2

HAU Crosslinking of Carboxylated Polymers

| Polymer | Polymer Form | Crosslinker | % Insoluble | Solvent |
|---|---|---|---|---|
| poly(AA) | Aq Solution | N,N-bis(2-hydroxyethyl)urea | 100 | water |
| Lexorez ™ 1405–65 AF[1] | Aq Solution | N,N-bis(2-hydroxyethyl)urea | 98 | water |
| Kurary ™ KM 118[2] | Aq Solution | N,N-bis(2-hydroxyethyl)urea | 69 | water |
| VA/AA/MAnh 45/35/20 | Aq Solution | N,N-bis(2-hydroxyethyl)urea | 99 | water |
| E/VA, 2 pants AA | Emulsion | None | 56 | acetone |
| E/VA, 2 parts AA | Emulsion | N,N-bis(2-hydroxyethyl)urea | 91 | acetone |

[1] proprietary COOH-Functionalized Polyester available from Inolex.
[2] carboxylated polyvinyl alcohol available from Kuraray.
Cure: 240° C., 10 minutes
1 equivalent crosslinker

TABLE 3

HAU Crosslinking of Mixtures of Poly(Acrylic Acids) and Non-polymeric Polyacids

| Polyacid | % Insoluble |
|---|---|
| citric acid | 75 |
| 1,2,4-benzene tricarboxylic acid | 89 |
| 1,2,4,5-benzene tetracarboxylic acid | 96 |

Polymer: poly(acrylic acid); 60,000 Mw
Crosslinker: N,N-bis(2-hydroxyethyl)urea
Equivalents: Crosslinker/P(AA)/polyacid 1/1/0.25
Solvent: water

TABLE 4

Color Comparison

Heat Discoloration: 150° C., 30 minutes

| Crosslinking System | As is | Ammonium Chloride Catalyst | Sodium Bisulfite Catalyst |
|---|---|---|---|
| Poly(acrylic acid) + N,N-bis(2-hydroxyethyl urea) | 2 | | |
| Poly(acrylic acid) + N,N'bis(2-hydroxyethyl urea) | 4 | | |

**Crosslinker level in above systems approximately 10 times level in systems below to exaggerate color effect

TABLE 4-continued

Color Comparison

Heat Discoloration: 150° C., 30 minutes

| Crosslinking System | As is | Ammonium Chloride Catalyst | Sodium Bisulfite Catalyst |
|---|---|---|---|
| EVA + 5 parts NMA | 1 | 3 | |
| DMHEA/HPA | 4* | 10 | 6.5 |

NMA is N metholyl acrylamide
HPA is hydroxypropyl acrylate
DMHEA is N-(2,2-dimethoxy-1-hydroxy)ethyl acrylamide
*not effective without catalyst
Color Rating: 1 = no color, 10 = severe color

TABLE 5

HAU Crosslinkers versus HAA Crosslinkers

| Crosslinker | % Insolubles |
|---|---|
| N,N-bis(2-hydroxyethyl)urea | 92 |
| bis[N,N-di(β-hydroxyethyl)]adipamide[9] | 91 |
| N,N-bis(3-hydroxypropyl adipamide)[9] | 74 |

Solvent: water
Polymer: poly(acrylic acid); 90,000 Mw
Cure: 240° C., 10 minutes
0.8 equivalents crosslinker
[9] HAA crosslinkers prepared according to methods described in U.S. Pat. No. 4,076,917.

TABLE 5a

| Crosslinker | Catalyst | % Insolubles |
|---|---|---|
| N,N-bis(2-hydroxyethyl)urea | yes | 52 |
| N,N-bis(2-hydroxyethyl)urea | no | 42 |
| bis[N,N-di(β-hydroxyethyl)]adipamide | yes | 51 |
| bis[N,N-di(β-hydroxyethyl)]adipamide | no | 3 |
| glycerol | no | 0 |

Solvent: water
Polymer: 60,000 Mw poly(acrylic acid)
Cure: 10 minutes, 150° C. in Al tares
Ratio: 1:08:0.08 carboxyl:hydroxyl:catalyst
Catalyst: sodium hypophosphite

TABLE 6

HAU and HAU formed in situ

| Crosslinker | % Insolubles |
|---|---|
| N,N-bis(2-hydroxyethyl)urea | 92 |
| diethanolamine/urea (in situ) | 95 |

Solvent: water
Polymer: poly(acrylic acid); 90,000 Mw
Cure: 240° C., 10 minutes
0.8 equivalents crosslinker

TABLE 7

Evaluation on Glass Substrate

| | Cure Time (min) | Temp. (deg C.) | Pick-up (%) | Wet Stiff (mgf) | % Insoluble |
|---|---|---|---|---|---|
| N,N-bis(2-hydroxyethyl)urea | 10 | 150 | 21% | 537 | 35.00 |
| | 10 | 250 | 21% | 3342 | 97.00 |
| No Crosslinker | 10 | 150 | 19% | 342 | 2.00 |
| | 10 | 250 | 21% | 2459 | 0.00 |

Polymer: poly(acrylic acid); 60,000 Mw
0.1 Equivalent Crosslinker:
Substrate: Whatman GF/B Glass Fiber Filter paper
Wet Soak: One minute in 0.5% Triton X100
Stiffness data obtained according to TAPPI method T543, pm-84 tested in machine direction with 1.0 × 1.5 inch sample size using a Gurley stiffness tester.

TABLE 7(a)

Evaluation on Cellulosic Substrate

| Crosslinker eq. OH/eq. COOH | Cure Time | Pickup % | Dry lb. | Wet lb. | 300° F. lb. |
|---|---|---|---|---|---|
| 0 | 5 min | 21.2 | 20.71 | 4.41 | 13.6 |
| 0 | 10 min | 21.2 | 17.63 | 5.62 | 13.85 |
| 0.1 | 5 min | 20.1 | 32.6 | 10.93 | 20.15 |
| 0.1 | 10 min | 20.1 | 24.36 | 12.29 | 17.57 |
| 0.3 | 5 min | 20.3 | 33.05 | 15.85 | 21.73 |
| 0.3 | 10 min | 20.3 | 26.43 | 16.16 | 18.63 |
| 0.8 | 5 min | 20.7 | 26.99 | 11.83 | 19.63 |
| 0.8 | 10 min | 20.7 | 28.15 | 13.9 | 21.03 |

Polymer: poly(acrylic acid); 60,000 Mw
Cure: 200 C.
Crosslinker: N,N-bis(2-hydroxyethyl)urea
Tensile strength data obtained according to TAPPI method T494, om-88.

TABLE 8

HAU Crosslinking of Polymers Comprising Amine

| Polymer | % Insoluble |
|---|---|
| polyethylenimine | 65 |
| poly(vinyl amine-covinyl alcohol) | 78 |

Cure: 240° C., 10 minutes
Crosslinker: 1 equivalent N,N-bis(2-hydroxyethyl)urea
Solvent: water

TABLE 9

HAU Crosslinking of Non-polymeric Polyacids

| Polyacid | % Insoluble |
|---|---|
| Citric acid monohydrate | 15 |
| 1,2,4-benzenetricarboxylic acid | 15 |
| 1,2,4,5-benzenetetracarboxylic acid | 15 |
| 1,2,3,4-butanetetracarboxylic acid | 90 |

Cure: 240° C. 10 minutes
Crosslinker: 1 equivalent N,N-bis(2-hydroxyethyl)urea
Solvent: water

TABLE 10

Varying Equivalents of Crosslinker

| Crosslinker Equivalents | % Insoluble |
|---|---|
| 1 | 93 |
| 0.5 | 93 |
| 0.25 | 98 |
| 0.1 | 86 |
| 0.05 | 96 |

Polymer: poly(acrylic acid); 90,000 Mw
Cure: 240° C., 10 minutes
Crosslinker: N,N-bis(2-hydroxyethyl)urea
Solvent: water

TABLE 11

Catalyzed Crosslinking

| Catalyst | % Insolubles |
|---|---|
| none | 42 |
| tin (II) oxalate | 100 |
| dibutyltin dilaurate | 99 |
| Tyzor ™ LA[(3)] | 98 |
| Ludox ™ SK[(4)] | 89 |
| kaolin clay | 85 |
| tributylamine | 84 |
| tripentylamine | 84 |
| triisobutylamine | 83 |
| sulfamic acid | 81 |
| Ludox ™ TMA[(4)] | 80 |
| Polycat DBU[(5)] | 79 |
| Zinplex 15[(6)] | 79 |
| DABCO[(7)] | 78 |
| boric acid | 78 |
| tin (II) chloride | 74 |
| tetrabutylammonium hydroxide | 72 |
| DABCO-T[(8)] | 71 |
| N-butyl morpholine | 68 |
| aluminum lactate | 66 |
| sodium metabisulfite | 64 |
| sodium hypophosphite | 52 |

Polymer: 60,000 Mw poly(acrylic acid)
Cure: 10 minutes, 150° C. in Al tares
Ratio: 1:0.8:0.08 carboxyl:hydroxyl:catalyst
Crosslinker: N,N-bis(2-hydroxyethyl)urea
Solvent: water
[(3)]Ammonium salt of lactic acid chelate of titanium available from E. I. duPont & Nemours.
[(4)]Colloidal silica available from E. I. duPont & Nemours.
[(5)]Diazabicyclo undecane available from Air Products.
[(6)]Proprietary zinc catalyst available from Ultra Additives.
[(7)]Diazabicyclo octane available from Air Products.
[(8)]2-(2-dimethyl amino ethyl)methylamino)ethanol available from Air Products.

We claim:

1. A composition, consisting essentially of:
a poly-functional molecule comprising at least two functional groups selected from the group consisting of carboxyl, anhydride and amine,
a crosslinking agent present in amounts effective to provide crosslinked compositions, said crosslinking agent comprising a single urea group and at least two hydroxyl groups, wherein at least two carbon atoms are disposed between the urea group and each of the hydroxyl groups; and
optionally, less than stoichiometric amounts of a catalyst.

2. The composition of claim 1 wherein the ratio of the sum total number of equivalents of functional groups contained in the poly-functional molecule to the number of equivalents of hydroxyl groups contained in the crosslinking agent ranges from about 1:1 to about 100:1.

3. The composition of claim 1 wherein the ratio of the sum total number of the equivalents functional groups contained in the poly-functional molecule to the total number of equivalents of hydroxyl groups contained in the crosslinkin agent ranges from about 5:4 to about 10:1.

4. The composition of claim 1 wherein the crosslinking agent is represented by Structure (I)

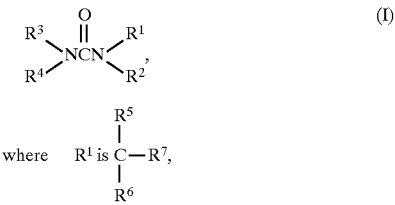

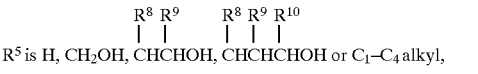

$R^2$ is H or $R^5$, $R^3$ is H or $R^5$, and $R^4$ is H, $R^1$, or $R^5$, where

$R^5$ is H, $CH_2OH$, $CHCHOH$, $CHCHCHOH$ or $C_1$–$C_4$ alkyl, $R^6$ is H, $CH_2OH$, $CHCHOH$, $CHCHCHOH$ or $C_1$–$C_4$ alkyl, and $R^7$ is H, $CH_2OH$, $CHCHOH$, $CHCHCHOH$ or $C_1$–$C_4$ alkyl, where $R^8$ is H, methyl or ethyl, $R^9$ is H, methyl or ethyl, and $R^{10}$ is H, methyl or ethyl; provided that said crosslinking agent comprises a single urea group and at least two hydroxyl groups, wherein at least two carbon atoms are disposed between the urea group and each of the hydroxyl groups.

5. The composition of claim 1 wherein said crosslinking agent is selected from the group consisting of N,N-bis(2-hydroxyethyl)urea, tetrakis(2-hydroxyethyl)urea, tris(2-hydroxyethyl)urea, N,N'-bis(2-hydroxyethyl)urea, N,N'-bis(3-hydroxypropyl)urea, N,N'-bis(4-hydroxybutyl)urea and 2-urea-2-ethyl-1,3-propanediol.

6. An article of manufacture comprising a composition which consists essentially of
a poly-functional molecule comprising at least two functional groups selected from the group consisting of carboxyl, anhydride and amine,
a crosslinking agent present in amounts effective to provide crosslinked compositions, said crosslinking agent comprising a single urea group and at least two hydroxyl groups, wherein at least two carbon atoms are disposed between the urea group and each of the hydroxyl groups and wherein said crosslinking agent is essentially free of formaldehyde; and
optionally, less than stoichiometric amounts of a catalyst.

7. The article of claim 6 wherein the ratio of the sum total number of equivalents of functional groups contained in the poly-functional molecule to the number of equivalents of hydroxyl groups contained in the crosslinking agent ranges from about 1:1 to about 100:1.

8. The article of claim 6 wherein said crosslinking agent is selected from the group consisting of N,N-bis(2-hydroxyethyl)urea, tetrakis(2-hydroxyethyl)urea, tris(2-hydroxyethyl)urea, N,N'-bis(2-hydroxyethyl)urea, N,N'-bis(3-hydroxypropyl)urea, N,N'-bis(4-hydroxybutyl)urea and 2-urea-2-ethyl-1,3-propanediol.

* * * * *